US012482126B2

(12) United States Patent
M S et al.

(10) Patent No.: US 12,482,126 B2
(45) Date of Patent: Nov. 25, 2025

(54) SYSTEM AND METHOD FOR CALCULATING THE FIELD OF VIEW OF A CAMERA USING A CHART

(71) Applicant: E-CON SYSTEMS INDIA PRIVATE LIMITED, Chennai (IN)

(72) Inventors: Senthilmurugan M S, Chennai (IN); Krithika Gurumurthy, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 487 days.

(21) Appl. No.: 18/186,275

(22) Filed: Mar. 20, 2023

(65) Prior Publication Data
US 2024/0320847 A1   Sep. 26, 2024

(51) Int. Cl.
*G06T 7/62*   (2017.01)
*G06T 7/543*   (2017.01)

(52) U.S. Cl.
CPC .............. *G06T 7/62* (2017.01); *G06T 7/543* (2017.01); *G06T 2207/10024* (2013.01)

(58) Field of Classification Search
CPC . G06T 7/62; G06T 7/543; G06T 2207/10024; G06T 2207/30204; G06T 7/80
See application file for complete search history.

(56) References Cited

U.S. PATENT DOCUMENTS

| 8,338,776 | B2 | 12/2012 | Walt et al. | |
| 2008/0129833 | A1* | 6/2008 | Jao | H04N 17/002 348/222.1 |
| 2020/0388019 | A1 | 12/2020 | Wei | |
| 2024/0061165 | A1* | 2/2024 | Nakayama | G02B 6/0065 |

FOREIGN PATENT DOCUMENTS

| CN | 113271409 A | | 7/2022 | |
| CN | 115623194 A | * | 1/2023 | ........... H04N 17/002 |
| WO | WO-2019061044 A1 | * | 4/2019 | ............. H04N 17/00 |

OTHER PUBLICATIONS

"IEEE, Draft Standard for Camera Phone Image Quality, 2016, IEEE" (Year: 2016).*

(Continued)

*Primary Examiner* — Oneal R Mistry
*Assistant Examiner* — Justin Philip Cascais
(74) *Attorney, Agent, or Firm* — Jason C. Cameron

(57) ABSTRACT

A system for calculating field of view is provided. The system includes a field of view chart which includes a circle, a vertical portion, a horizontal portion, and a diagonal portion. The circle with a predefined diameter is positioned at the center of the field of view chart. The vertical portion is positioned at a predefined distance from the circle and includes a plurality of first rectangles positioned at a pre-defined distance from each other. The horizontal portion is positioned at a pre-defined distance from the circle and the vertical portion and includes a plurality of second rectangles positioned at a predefined distance from each other. The diagonal portion is positioned between the vertical portion and the horizontal portion and at a predefined distance and at a predefined angle from the center circle. The diagonal portion includes a plurality of arcs with a predefined thickness.

17 Claims, 7 Drawing Sheets

(56) References Cited

OTHER PUBLICATIONS

"Bozhe, Femtosecond laser 3D printed micro objective lens for ultrathin fiber endoscope, 2022, Fundamental Research, 4, 123-130" (Year: 2022).*

"Yan, A Novel Concentric Circular Coded Target, and Its Positioning and Identifying Method for Vision Measurement under Challenging Conditions, 2021, Sensors, vol. 21 Issue 3" (Year: 2021).*

* cited by examiner

SYSTEM AND METHOD FOR CALCULATING THE FIELD OF VIEW OF A CAMERA USING A CHART

FIELD OF INVENTION

Embodiments of a present disclosure relate to a technical field of distance calculation and more particularly to a system and a method for calculating the field of view of a camera using a chart.

BACKGROUND

Field of view (FOV) is an open, observable area that a person can see through their eyes or via an optical device, such as a camera. Specifically, the field of view is the maximum area of a sample that a camera can image. The performance of various image output devices, such as virtual reality (VR) devices and the like is calculated by the field of view.

Typically, during the calculation of the field of view, the user may have some accuracy errors due to distortion, and takes more time to validate a diagonal FOV, vertical FOV, and horizontal FOV individually by using a measuring tape or scale. Further, there is no technique available today for calculating the diagonal FOV, vertical FOV, and horizontal FOV at the same time.

There is a need for a system that is cost-effective. Also, there is a need for a system that accurately calculates the FOV. Further, there is a need of a system that enables a user to calculate a diagonal FOV, horizontal FOV, and vertical FOV at the same time.

Hence, there is a need for a system and a method for calculating the field of view which addresses the aforementioned issues.

BRIEF DESCRIPTION

In accordance with another embodiment, a method for calculating the field of view of a camera using a chart is disclosed. The method includes placing, the camera module in front of a field of view chart wherein the camera lens is aligned centrally with the center of the field of view chart. The method also includes capturing the image of a field of view chart and measuring the distance between the field of view chart and the camera lens. Further, the method includes obtaining an image of a field of view chart wherein the field of view chart is positioned in front of a camera lens and a distance value between the camera lens and the field of view chart. Furthermore, the method includes calculating a diameter of a center circle in the chart by getting the number of pixels in the horizontal of the center circle. Furthermore, the method includes generating an image pertaining to each of a horizontal field of view, a vertical field of view, and a diagonal field of view by slicing a threshold image from the calculated diameter of the center circle. calculating a horizontal distance, vertical distance, and diagonal distance covered by contouring the horizontal field of view, the vertical field of view, and the diagonal field respectively. Furthermore, the method includes calculating a field of view by using the calculated horizontal distance, vertical distance, and diagonal distance. Furthermore, the method includes displaying, the calculated field of view and plotting the contours in the image.

In accordance with one embodiment of the disclosure a system for calculating a field of view of a camera using a chart is disclosed. The field of view chart for calculating a field of view. The chart includes a circle, a vertical portion, a horizontal portion, and a diagonal portion. The circle is positioned at the center of the chart with a predefined diameter. The vertical portion is positioned at a predefined distance from the circle. The vertical portion includes a plurality of first rectangles positioned at a predefined distance from each other. The horizontal portion is positioned at a pre-defined distance from the circle and the vertical portion. The horizontal portion includes a plurality of second rectangles positioned at a predefined distance from each other. The diagonal portion is positioned between the vertical portion and the horizontal portion at a predefined distance and at a predefined angle from the center circle. The diagonal portion includes a plurality of arcs with a predefined thickness.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
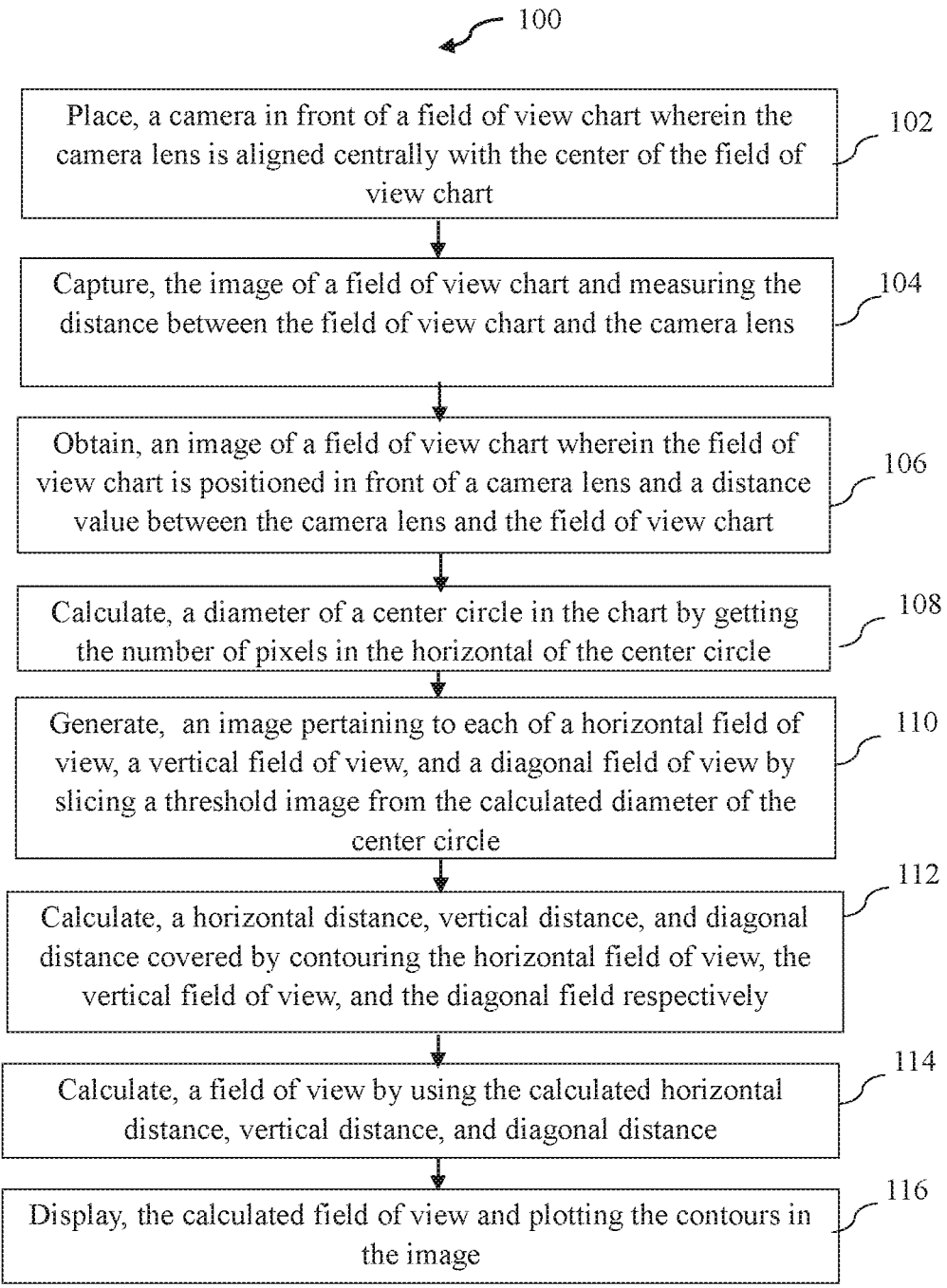
FIG. 1 is a flow chart representing steps involved in a method for calculating a field of view of a camera using a chart in accordance with an embodiment of the present disclosure.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a method for calculating the field of view of a camera using a chart is disclosed. The method includes placing, the camera module in front of a field of view chart wherein the camera lens is aligned centrally with the center of the field of view chart, then capturing the image of a field of view chart and measuring the distance between the field of view chart and the camera lens, after this the method includes obtaining an image of a field of view chart wherein the field of view chart is positioned in front of a camera lens and a distance value between the camera lens and the field of view chart, then calculating a diameter of a center circle in the chart by getting the number of pixels in the horizontal of the center circle. Also, the method includes generating an image pertaining to each of a horizontal field of view, a vertical field of view, and a diagonal field of view by slicing a threshold image from the calculated diameter of the center circle. Further, the method includes calculating a horizontal distance, vertical distance, and diagonal distance covered by contouring the horizontal field of view, the vertical field of view, and the diagonal field respectively. Furthermore, the method includes calculating a field of view by using the calculated horizontal distance, vertical distance, and diagonal distance. Furthermore, the method includes displaying, the calculated field of view and plotting the contours in the image.

FIG. 1 is a flow chart representing steps involved in a method 100 for calculating a field of view in accordance with an embodiment of the present disclosure. In one embodiment, the prerequisite for executing the steps of the method 100 are:

1. Place a FOV chart in front of a camera that covers the maximum number of possible dots.
2. The chart background is completely white except for the dark part. There is no dust on the chart.
3. The sensor is clean and there are no blemishes.
4. The centre of the circle in the chart is placed on the image centre.
5. The chart is placed without light shade.
6. The target object is well-focused.

The method includes placing, the camera module in front of a field of view chart wherein the camera lens is aligned centrally with the center of the field of view chart in step 102. The method also includes placing, centre of the circle in the field of view chart, on the image centre.

The method 100 also includes capturing, the image of a field of view chart and measuring the distance between the field of view chart and the camera lens in step 104. The method also includes alerting, the user if the camera is not aligned center to the chart center. The method also includes positioning, the circle at the center of the chart with a predefined diameter helps to identify a number of pixels need to slice the threshold image. In one embodiment, the captured image and measure the distance between the chart and the camera lens is an input to an algorithm for calculating FOV. The image processing may be done on the input image and display the FOV value in the output image.

Further, the method 100 includes obtaining an image of a field of view chart wherein the field of view chart is positioned in front of a camera lens and a distance value between the camera lens and the field of view chart in step 106.

Furthermore, the method 100 includes calculating a diameter of a center circle in the chart by getting the number of pixels in the horizontal of the center circle in step 108. The method also includes focusing, a target object before calculating the field of view.

Furthermore, the method 100 includes generating an image pertaining to each of a horizontal field of view, a vertical field of view, and a diagonal field of view by slicing a threshold image from the calculated diameter of the center circle in step 110.

Furthermore, the method 100 includes calculating a horizontal distance, vertical distance, and diagonal distance covered by contouring the horizontal field of view, the vertical field of view, and the diagonal field respectively in step 112. The method also includes obtaining, the diagonal, vertical and horizontal distances of a subject are based on the number of arcs of the plurality of arcs and the number of rectangles of the plurality of rectangles covered by the chart. The method also includes calculating, a diagonal field of view, by using a diagonal dot chart, by obtaining the diagonal distance of a subject based on the number of dots of the plurality of dots covered by the chart.

Furthermore, the method 100 includes calculating a field of view by using the calculated horizontal distance, vertical distance and diagonal distance in step 114. The method also includes using, a donut chart for calculating the diagonal field of view, vertical field of view, and horizontal field of view by obtaining the diagonal distance, the vertical distance, and the horizontal distance of the subject based on the total number of circles covered by the chart.

Furthermore, the method 100 includes displaying, the calculated field of view and plotting the contours in the image in step 116.

Figure 2:
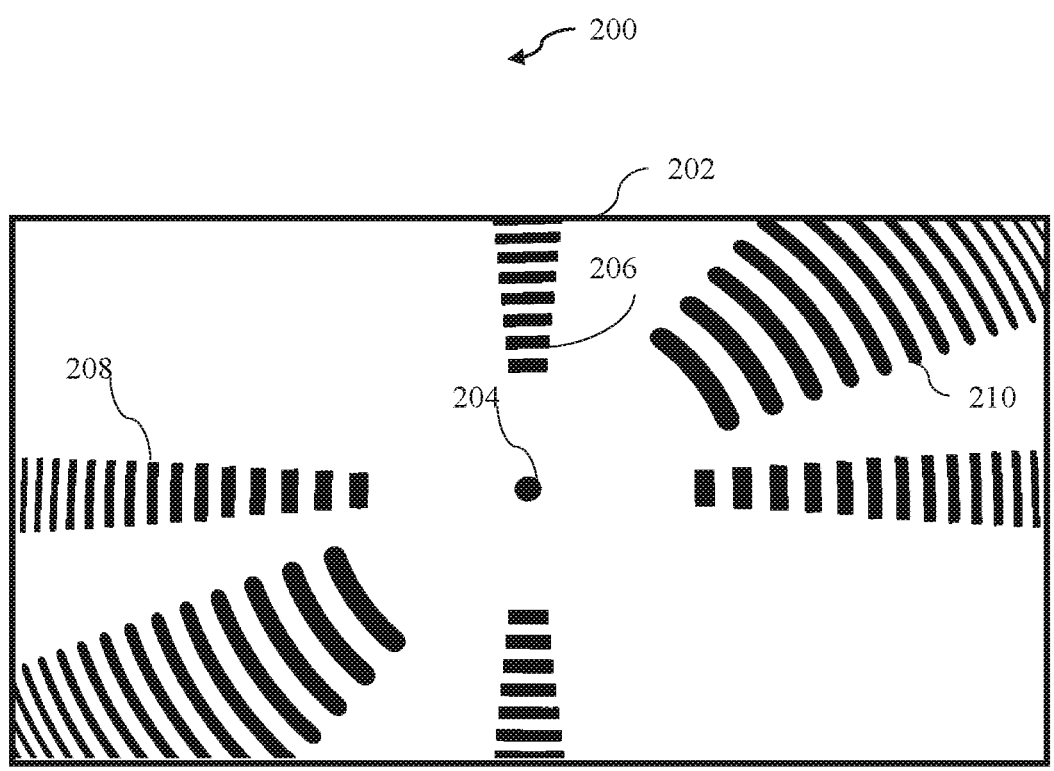
FIG. 2 is a schematic representation of an input image of a field of view chart of a camera using a chart in accordance with an embodiment of the present disclosure.

FIG. 2 is a schematic representation of an input image of field of view chart 202 of a system 200 for calculating a field of view in accordance with an embodiment of the present disclosure. The field of view (FOV) chart 202 includes a circle 204, a vertical portion 206, a horizontal portion 208, and a diagonal portion 210. In one embodiment, the field of view chart 202 is a diagonal dot patches chart including a plurality of dots aligned at a slanted angle, wherein the diagonal dot chart calculates the diagonal field of view, by obtaining the diagonal distance of a subject based on the number of dots of the plurality of dots covered by the chart. In another embodiment, the field of view chart 202 is a donut chart including a plurality of concentric circles. The donut chart calculates the diagonal field of view, vertical field of view, and horizontal field of view by obtaining the diagonal distance, the vertical distance, and the horizontal distance of the subject based on the total number of circles covered by the FOV chart 202. Yet, in one embodiment, the field of view chart 202 is a colour mapping field of view chart 700 including a vertical part. The vertical part includes a plurality of first color dots, a horizontal portion 208 includes a plurality of second color dots, and a diagonal part including a plurality of color arcs with a pre-defined thickness. Further, in one embodiment, the diagonal part, the vertical part, and the horizontal portion 208 of the color mapping chart includes a different pixel value in a horizontal frame, a vertical frame, and a diagonal frame as each color dot is segregated in a distinct manner.

The circle 204 is positioned at the center of the FOV chart 202 with a predefined diameter. In one embodiment, a circle 204 is positioned at the center of the FOV chart 202 with a predefined diameter helps to identify a number of pixels need to slice the threshold image.

The vertical portion 206 positioned at a predefined distance from the circle 204, wherein the vertical portion 206 includes a plurality of first rectangles 212 positioned at a predefined distance from each other.

The horizontal portion 208 is positioned at a pre-defined distance from the circle 204 and the vertical portion 206. The horizontal portion 208 includes a plurality of second rectangles positioned at a predefined distance from each other. In one embodiment, the second plurality of rectangles includes a predefined height bigger than the first plurality of rectangles and a predefined width. The width of each rectangle of the plurality of rectangles is increased as compared to the previous adjacent rectangle which helps to neglect the lens tilt.

The diagonal portion 210 positioned between the vertical portion 206 and the horizontal portion 208 and at a pre-defined distance and at a predefined angle from the center circle 204. The diagonal portion 210 includes a plurality of arcs with a predefined thickness. In one embodiment, the plurality of arcs includes a predefined thickness and a predefined width. The width of each rectangle of the plurality of rectangles is increased as compared to the previous adjacent rectangle based on the angular radius between a predefined range of degrees which helps to validate the different resolution.

In one embodiment distance between the lens and the chart is set. In another embodiment, the distance value may be in millimetres. After getting the FOV chart 200, the diameter of the centre circle 204 is calculated by using contour, arc length, and approx. Poly DP method. In one embodiment, the approx. Poly DP method approximates a curve with another curve with fewer vertices so that the distance between them is less or equal to the specified precision.

In one embodiment, the circle 204 in the centre of the chart is 10 mm diameter, the vertical part of the chart includes rectangles following 6 mm in height and width starting with 15 mm will increase by 5 mm to the adjacent one and the distance between adjacent rectangles is 10 mm. The horizontal portion 208 of the chart includes rectangles following 8 mm in width and height starting with 15 mm will increase by 5 mm to the adjacent one and the distance between adjacent rectangles is 15 m. The diagonal portion 210 of the chart includes arcs following 10 mm in thickness, a distance between the concentric centre is 20 mm and an angle of 30 degrees from 20 degrees to 50 degrees. The diagonal, vertical and horizontal distances of a required subject based on the total number of arcs and rectangles covered by the chart are obtained to calculate DFOV, VFOV and HFOV. The FOV chart facilitates reducing the difficulty to place the centre of the circle 204 in the chart on the image centre as per the prerequisite for test setup. The system 200 indicates the centre of the image to the user while streaming and may be helpful in placing the centre of the circle 204 in the chart on the image centre. In one embodiment, the plurality of parameters is processed by approximating a shape of a contour of a given polygon to the shape of the original polygon to the specified precision.

In one embodiment, for calculating the diagonal field of view, the vertical field of view, and the horizontal field of view, the diagonal, vertical and horizontal distances of a subject are obtained based on the number of arcs of the plurality of arcs and the number of rectangles of the plurality of rectangles covered by the chart. In another embodiment, the field of view chart 202 is placed in front of a camera lens and covers an optimum number of the first plurality of rectangles, the second plurality of rectangles, and the plurality of arcs which are aided as measuring units for the algorithm.

Figure 3A:
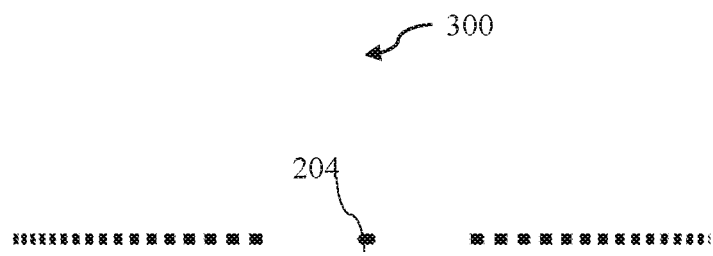
FIG. 3a is a schematic representation of images for a horizontal field of view by slicing the threshold image from the calculated diameter of the centre circle of FIG. 2 in accordance with an embodiment of the present disclosure.
Figure 3B:
FIG. 3b is a schematic representation of images for a vertical field of view by slicing the threshold image from the calculated diameter of the centre circle of FIG. 2 in accordance with an embodiment of the present disclosure.
Figure 3C:
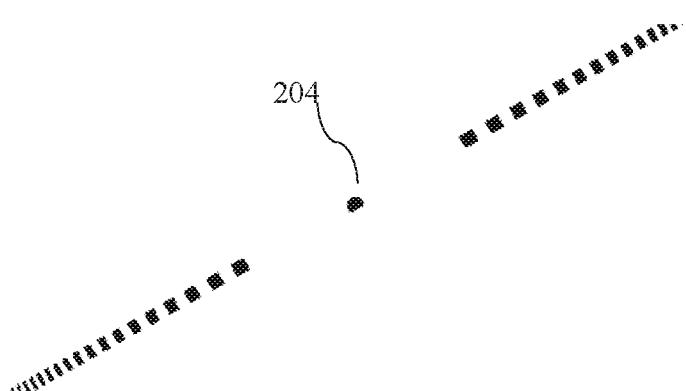
FIG. 3c is a schematic representation of images for a diagonal field of view by slicing the threshold image from the calculated diameter of the centre circle of FIG. 2 in accordance with an embodiment, of the present disclosure.

FIG. 3a is a schematic representation of images for a horizontal field of view (HFOV) by slicing the threshold image from the calculated diameter of the centre circle 204 of FIG. 2 in accordance with an embodiment of the present disclosure, FIG. 3b is a schematic representation of images for a vertical field of view (VFOV) by slicing the threshold image from the calculated diameter of the centre circle 204 of FIG. 2 in accordance with an embodiment, of the present disclosure, and FIG. 3c is a schematic representation of images for a diagonal field of view (DFOV) by slicing the threshold image from the calculated diameter of the centre circle 204 of FIG. 2 in accordance with an embodiment, of the present disclosure.

In one embodiment, the horizontal, the vertical, and the diagonal distance covered are calculated by contouring the HFOV, VFOV, and DFOV images.

Figure 4:
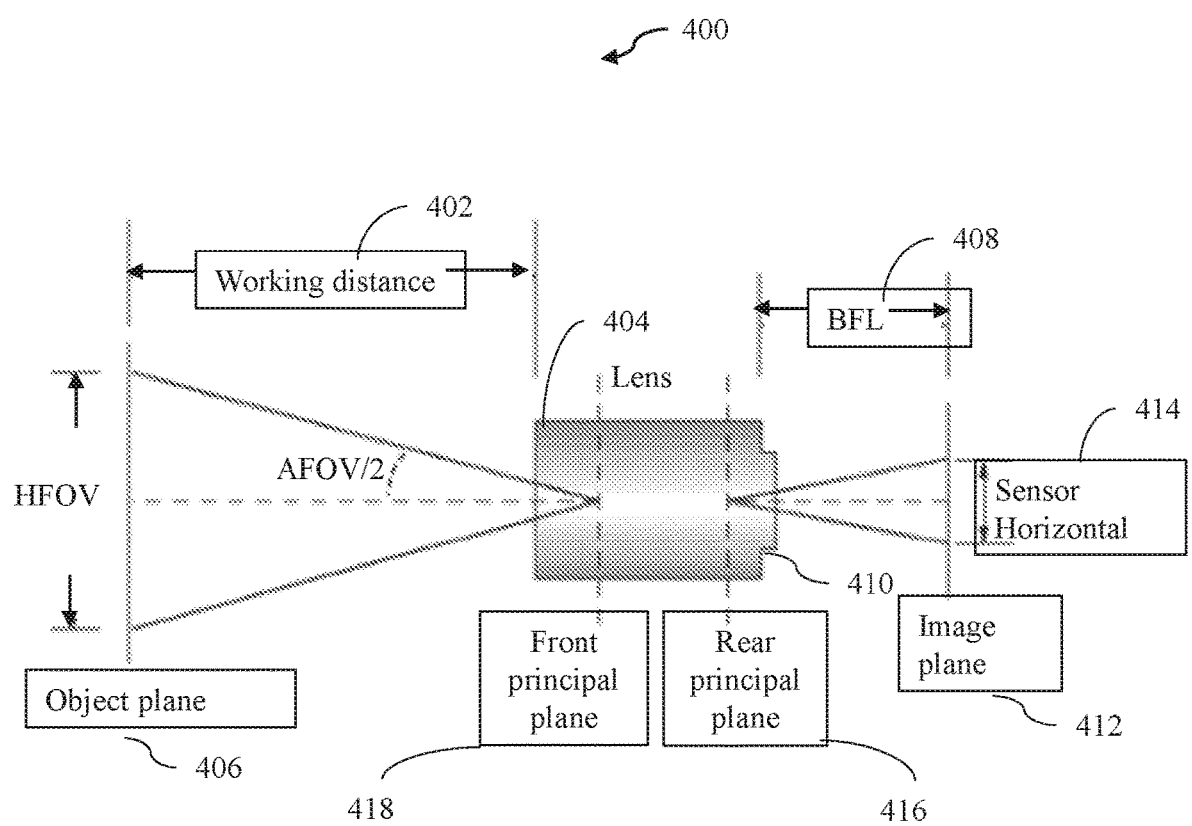
FIG. 4 is a schematic representation of a horizontal field of view of FIG. 2 in accordance with an embodiment of the present disclosure.

FIG. 4 is a schematic representation of a horizontal field of view (HFOV) of FIG. 2 in accordance with an embodiment of the present disclosure. In one embodiment, the horizontal field of view may be calculated by using the following formula:

$$AFOV(°) = 2 \times \tan^{-1}\left(\frac{\text{Horizontal } FOV \text{ (mm)}}{2 \times WD \text{ (mm)}}\right)$$

In one embodiment, the AFOV is the actual field of view. A working distance 402 is a distance from the lens 404 to an object plane 406. A back focal length (BFL) 408 is a distance from the front portion of the camera 410 to the image plane 412. The sensor horizontal view 414 is calculated by plotting the angular projection from the center of the rear principal plane 416 to the image plane 412. The HFOV is calculated by calculating the distance from a center of a front principal plane 418 to the object plane 406. The distance is the angular projection with an angle value half of the actual field of view value.

Figure 5:
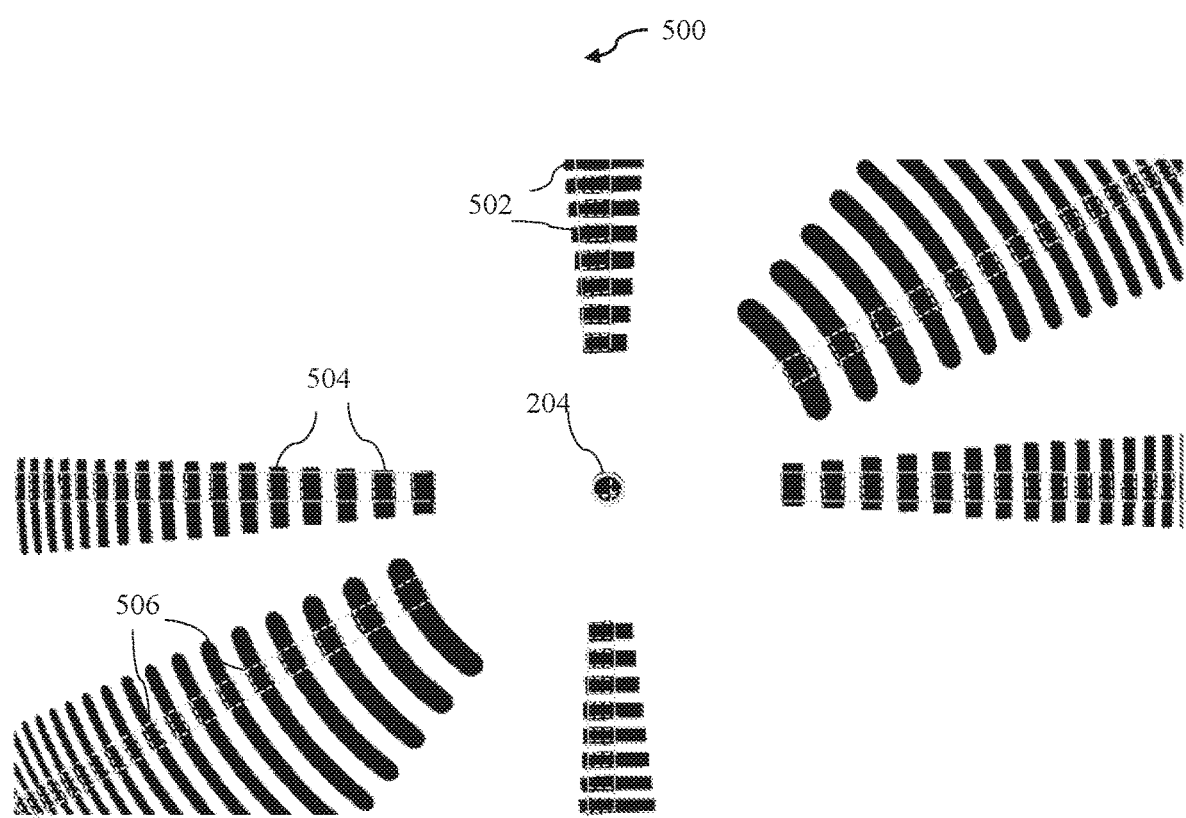
FIG. 5 is a schematic representation of an output image of the field of view chart of FIG. 2 in accordance with an embodiment of the present disclosure.

FIG. 5 is a schematic representation of the output image 500 of the field of view chart 202 of FIG. 2 in accordance with an embodiment of the present disclosure. The vertical portion 206 includes a plurality of first rectangles 502 positioned at a predefined distance from each other. The horizontal portion 208 includes a plurality of second rectangles 504 positioned at a predefined distance from each other. The diagonal portion 210 includes a plurality of arcs 506 with a predefined thickness.

In one embodiment, the diagonal field of view is 120.08, the horizontal field of view is 117.03, and the vertical field of view is 78.45. In one embodiment, the colour of the plurality of first rectangles 502, the plurality of second rectangles 504, and the plurality of arcs 506 are the same, and their colours are different from the background color of the chart helps to get a binary image by partitioning the high-intensity pixel and low-intensity pixel.

Figure 6:
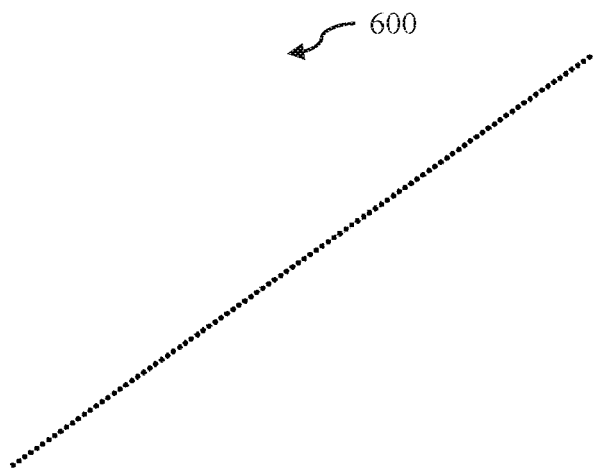
FIG. 6 is a schematic representation of a diagonal dot patches chart of FIG. 1 in accordance with an embodiment of the present disclosure.

FIG. 6 is a schematic representation of a diagonal dot patches chart of FIG. 1 in accordance with an embodiment of the present disclosure. Specifically, for the diagonal dot patches chart the distance between adjacent dots is 5 mm. The dots are aligned at a slanted angle. The diagonal dot patches chart calculates the DFOV by getting the diagonal distance of a required subject based on the total number of dots covered by the diagonal dot patches chart.

Figure 7:
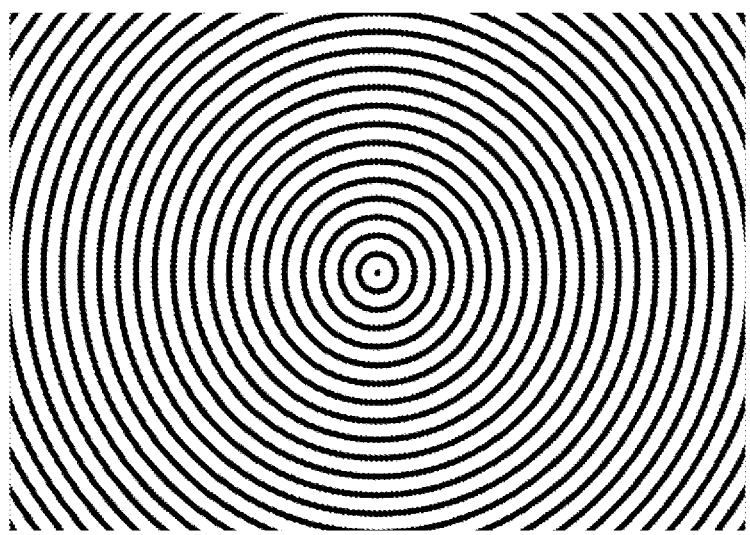
FIG. 7 is a schematic representation of a donut chart of FIG. 1 in accordance with an embodiment of the present disclosure.

FIG. 7 is a schematic representation of a donut chart of FIG. 1 in accordance with an embodiment of the present disclosure. In one embodiment, for the donut chart the diameter of the centre circle 204 is 8 mm, the thickness of the remaining circles is 5 mm, and the distance between concentric circles is 20 mm. In one embodiment, the DFOV, the VFOV, and the HFOV is calculates and the diagonal, the vertical, and the horizontal distances are obtained which are of a required subject based on the total number of circles covered by the donut chart. By using the system 100 the donut chart solves the issues including aspect ratio, bifurcation of corners and lens tilted issue and got resolved.

Figure 8:
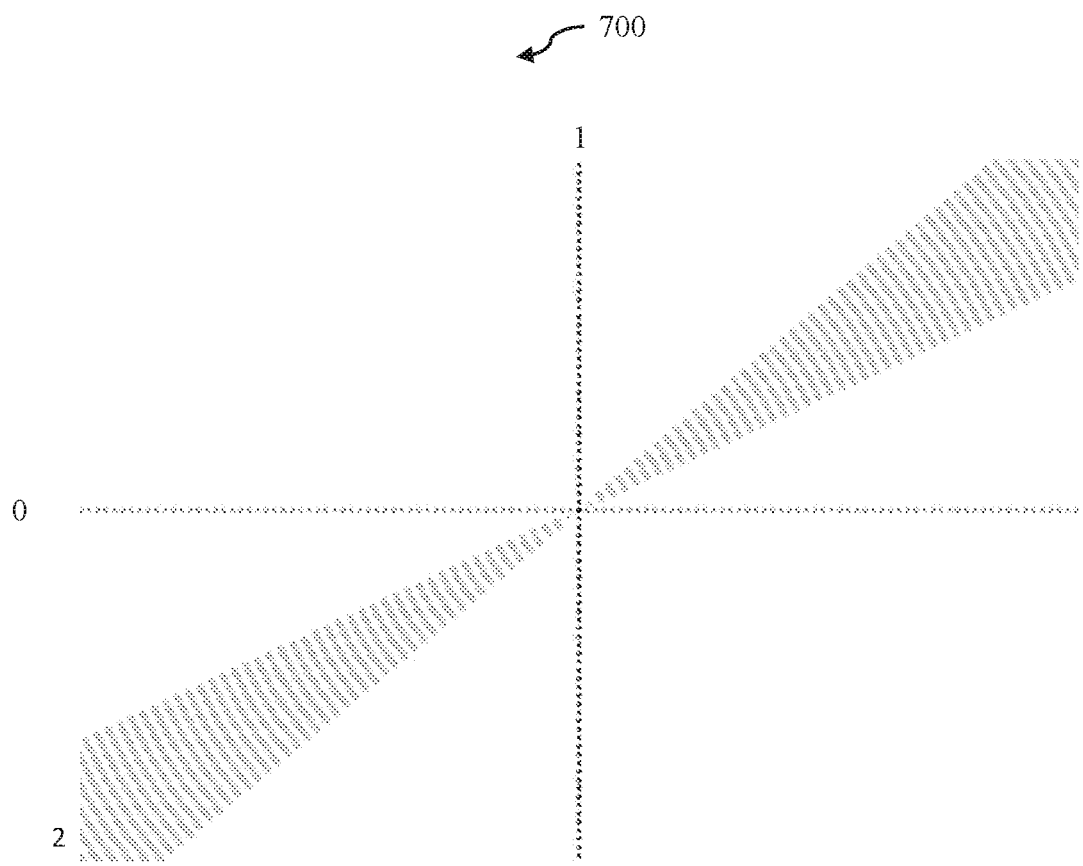
FIG. 8 is a schematic representation of a color mapping field of view chart of FIG. 2 in accordance with an embodiment of the present disclosure.

FIG. 8 is a schematic representation of a color mapping field of view chart 700 of FIG. 2 in accordance with an embodiment of the present disclosure. For the colour mapping field of view, the center of the color mapping chart 700 includes a dark black (RGB [0, 0, 0]) circle 204 of 3 mm diameter, a vertical part of the color mapping chart 700 includes dots of magenta (RGB [255, 0, 255]) colour following a diameter of 3 mm and an adjacent distance of 10 mm. In one embodiment, a horizontal portion of the color mapping chart 700 includes dots of Cyan (RGB [0, 255, 255]) colour following a diameter of 3 mm and an adjacent distance of 10 mm. In another embodiment, a diagonal portion of the color mapping chart 700 includes arcs of Yellow (RGB [255, 255, 0]) colour following a thickness of 10 mm. The distance between the concentric centre is 20 mm and an angle of 30 degrees. In one embodiment, the colour mapping field of view chart 700 may calculate DFOV, VFOV and HFOV for obtaining vertical and horizontal distances of a required subject based on the total number of arcs and dots covered by the color mapping chart 700. In another embodiment, the color mapping field of view chart 700 may have a different pixel value in each frame and easy to segregate each colour dot in a separate manner.

Note:
$0^{th}$ frame for Horizontal.
$1^{st}$ frame for Vertical.
$2^{nd}$ frame for Diagonal.

In one embodiment, the color mapping field of view increases the feasibility of chart placement as the distance covered in each part of the color mapping chart 700 is in the convenient form. In another embodiment, to calculate DFOV, VFOV and HFOV, the diagonal, vertical and horizontal distances of a required subject are obtained based on the total number of arcs and dots covered by the color mapping chart. Each part of the chart follows a different pixel value in each frame, enabling easy segregation of each colour dot in a separate manner. In one embodiment, the system 200 facilitates obtaining dots and arcs in the frame even if the colour sensor has different RGB values.

Various embodiments of the present disclosure provide a system and a method for calculating the field of view. The system disclosed in the present disclosure is cost-effective. The method disclosed in the present disclosure is easy to operate. Also, the system that accurately calculates the FOV. Further, the system enables a user to calculate a diagonal FOV, horizontal FOV, and vertical FOV at the same time. The method disclosed in the present disclosure facilitates feasibility in the segregation of corner dots. The system facilitates easy segregation of each color dot in a separate manner.

Further, the present disclosure reduces the difficulty in placing the centre of the circle in the chart on the image centre. The present disclosure indicates the centre of the image to the user while streaming which may be helpful in placing the centre of the circle in the chart on the image centre.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. A method for calculating the field of view of a camera using a chart comprising:
   placing, the camera module in front of a field of view chart wherein the camera lens is aligned centrally with the center of the field of view chart;
   capturing the image of a field of view chart and measuring the distance between the field of view chart and the camera lens;

obtaining an image of a field of view chart wherein the field of view chart is positioned in front of a camera lens and a distance value between the camera lens and the field of view chart;

calculating a diameter of a center circle in the field of view chart by getting the number of pixels in the horizontal of the center circle;

generating an image pertaining to each of a horizontal field of view, a vertical field of view, and a diagonal field of view by slicing a threshold image from the calculated diameter of the center circle;

calculating a horizontal distance, vertical distance, and diagonal distance covered by contouring the horizontal field of view, the vertical field of view, and the diagonal field respectively;

calculating a field of view by using the calculated horizontal distance, vertical distance and diagonal distance; and displaying, the calculated field of view and plotting the contours in the image.

2. The method according to claim 1, comprises placing, centre of the circle in the field of view chart, on the image centre.

3. The method according to claim 2, comprises alerting the user if the camera is not aligned center to the field of view chart center.

4. The method according to claim 1, comprises focusing a target object before calculating the field of view.

5. A system for calculating a field of view of a camera using a chart comprises:
   a field of view chart for calculating a field of view, wherein the field of view chart comprises:
   a circle positioned at the center of the field of view chart with a predefined diameter;
   a vertical portion positioned at a predefined distance from the circle, wherein the vertical portion comprises a plurality of first rectangles positioned at a predefined distance from each other;
   a horizontal portion positioned at a pre-defined distance from the circle and the vertical portion, wherein the horizontal portion comprises a plurality of second rectangles positioned at a predefined distance from each other; and
   a diagonal portion positioned between the vertical portion and the horizontal portion and at a predefined distance and at a predefined angle from the center circle, wherein the diagonal portion comprises a plurality of arcs with a predefined thickness.

6. The system according to claim 5, wherein the field of view field of view chart is a diagonal dot patches chart comprising a plurality of dots aligned at a slanted angle, wherein the diagonal dot chart calculates the diagonal field of view, by obtaining the diagonal distance of a subject based on the number of dots of the plurality of dots covered by the diagonal dot patches chart.

7. The system according to claim 5, wherein the field of view chart is a donut chart comprising a plurality of concentric circles, wherein the donut chart calculates the diagonal field of view, vertical field of view, and horizontal field of view by obtaining the diagonal distance, the vertical distance, and the horizontal distance of the subject based on the total number of circles covered by the donut chart.

8. The system according to claim 5, wherein the field of view chart is a colour mapping field of view chart comprising a vertical part wherein the vertical part comprises a plurality of first color dots, a horizontal part comprising a plurality of second color dots, and a diagonal part comprising a plurality of color arcs with a pre-defined thickness.

9. The system according to claim 8, wherein the diagonal part, the vertical part, and the horizontal part of the color mapping chart comprises a different pixel value in a horizontal frame, a vertical frame, and a diagonal frame as each color dot is segregated in a distinct manner.

10. The system according to claim 5, wherein a circle is positioned at the center of the field of view chart with a predefined diameter helps to identify a number of pixels need to slice the threshold image.

11. The system according to claim 5, wherein the field of view chart is placed in front of a camera lens and covers an optimum number of the first plurality of rectangles, the second plurality of rectangles, and the plurality of arcs which are aided as measuring units for the algorithm.

12. The system according to claim 5, wherein the first plurality of rectangles comprises a predefined height and a predefined width, wherein the width of each rectangle of the plurality of rectangles is increased as compared to the previous adjacent rectangle which helps to neglect lens tilt.

13. The system according to claim 5, wherein the second plurality of rectangles comprises a predefined height bigger than the first plurality of rectangles and a predefined width, wherein the width of each rectangle of the plurality of rectangles is increased as compared to the previous adjacent rectangle which helps to neglect the lens tilt.

14. The system according to claim 5, wherein the plurality of arcs comprises a predefined thickness and a predefined width, wherein the width of each rectangle of the plurality of rectangles is increased as compared to the previous adjacent rectangle based on the angular radius between a predefined range of degrees which helps to validate the different resolution.

15. The system according to claim 5, wherein the plurality of parameters is processed by approximating a shape of a contour of a given polygon to the shape of the original polygon to the specified precision.

16. The system according to claim 5, wherein the colour of the plurality of first rectangles, the plurality of second rectangles, and the plurality of arcs are same, wherein the of the plurality of first rectangles, the plurality of second rectangles and the plurality of arcs are different from the background color of the field of view chart helps to get a binary image by partitioning the high-intensity pixel and low-intensity pixel.

17. The system according to claim 5, wherein for calculating the diagonal field of view, the vertical field of view, and the horizontal field of view, the diagonal, vertical and horizontal distances of a subject are obtained based on the number of arcs of the plurality of arcs and the number of rectangles of the plurality of rectangles covered by the field of view chart.

* * * * *